Sept. 24, 1968  K. J. KOLLMANN  3,402,953

DISCONNECTABLE COUPLING

Filed Oct. 23, 1965

INVENTOR.
KARL J. KOLLMANN
BY
Charles L. Lovercheck
atty

United States Patent Office 3,402,953
Patented Sept. 24, 1968

3,402,953
DISCONNECTABLE COUPLING
Karl J. Kollmann, 3615 Sassafras St.,
Erie, Pa. 16508
Filed Oct. 23, 1965, Ser. No. 503,411
1 Claim. (Cl. 287—103)

ABSTRACT OF THE DISCLOSURE

The present invention involves a coupling for a sewer snake wherein the T-shaped female slot is formed in one coupling member and a T-shaped male headed member is attached to the other coupling member. The T-shaped head is adapted to fit in the female slot. The female slot has overlying flanges which overlie the head on the male member and the sides of the flanges that engage the male member incline toward the center of the slot and toward the coupling member in which the female member is attached. The bottom of the female slot has surfaces that incline outward and away from the member having the female slot in it and these surfaces cooperate with the surfaces on the overlying flanges and prevent the flanges from spreading away from each other when a tensile stress is imposed between the two coupling members.

---

This invention relates to couplings and, more particularly, to a disconnectable coupling for connecting two flexible shafts; for example, two sections of sewer snake.

Couplings which are presently known in the field of sewer snakes utilize a lateral slot in one body member that receives a T-shaped member. The surfaces defining an undersurface of the head of the T-shaped member are usually perpendicular to the central axis of the shaft or they incline slightly away from the bottom of the T-shaped head so that the head tends to enlarge the slot and to pull out of the T-slot.

It has been discovered that by inclining the surface of the head outward and toward the body on which the head is supported and, likewise, inclining the mating surfaces of the female member, the head will tend to pull the slot together and will therefore resist being pulled out of the slot.

It is, accordingly, an object of the present invention to provide an improved coupling.

Another object of the invention is to provide a coupling for a sewer snake having an improved shaped head thereon.

With the above and other objects in view, the present invention consists of the combination and arrangement of parts hereinafter more fully described, illustrated in the accompanying drawing and more particularly pointed out in the appended claim, it being understood that changes may be made in the form, size, proportions, and minor details of construction without departing from the spirit or sacrificing any of the advantages of the invention.

Figures 1, 2:
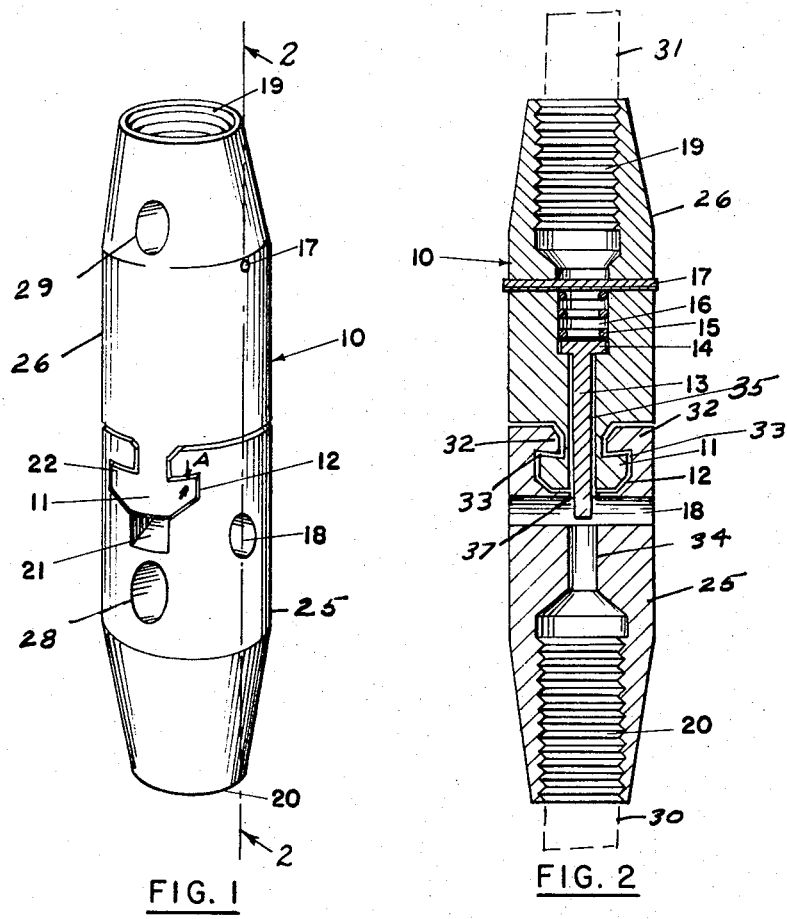
FIG. 1 is an isometric view of a coupling according to the invention.
FIG. 2 is a longitudinal cross sectional view taken on line 2—2 of FIG. 1.

Now with more particular reference to the drawing, the coupling is made up of a first body member 25 and a second body member 26. The body members are both generally cylindrical in shape and have a threaded opening 19 and 20 at each end which receive a threaded plug and sewer snake section indicated at 30 and 31. The end of the snake may be received in holes 28 and 29. Instead of a sewer snake, there could be inserted in the holes sewer rods, any type of shafting, sucker rods for pumps and well drilling rigs, wire ropes, or links. The connection could be used for connecting safety hitches for trailers. The coupling could have a laterally extending end that could be received in holes 28 and 29 in a conventional manner. Obviously any suitable connection could be used to connect this rod or snake to the body members 25 and 26.

A diametrically disposed slot is formed in the first body member 25 and it defines a female opening in the end 31 of the body member 25. The slot 12 is generally T-shaped and has flanges 32 which overlie the slot and has surfaces 33 which are generally flat and define the outer side of the slot. The flat surfaces 33 incline toward the center line of the body member 25 and toward the main part of the body member 25 at an angle A of approximately five degrees.

The second body member 26 has a head 11 that is a counterpart of the slot 12. The head 11 has a stem that attaches it to the body member 26 and the head portion has a surface that lies adjacent the surface 33 and inclines away from the body member 26 and toward the center line of the body member 26 at an angle of approximately five degrees, for example.

The body members 25 and 26 each have an axial bore 34 and 35. The bore 35 receives the pin 13 which has a head 14. The head is received in the counterbore 16 and a spring 15 is likewise received in the counterbore. The spring rests against the pin 17 that is received in a lateral hole which forms a stop for the spring. Thus, the pin 13 is urged into the central hole 37 in the body member 25.

A lateral keyhole 18 is formed in the body member 25 and it is adapted to receive a round key flattened at one end to a wedge shape which can be inserted under the end of the pin 13 to force it back into the head 11 and thereby allow the head 11 to slide laterally in the slot 12.

It will be noted that the outer surface of the head 11 conforms to the contour of the body member 25.

An inclined surface 21 is formed at the outer edge of the body member 25 adjacent the slot 12 and this edge engages the distal end of the pin 13 to cause it to compress the spring 15 when the coupling is assembled.

The foregoing specification sets forth the invention in its preferred practical forms but the structure shown is capable of modification within a range of equivalents without departing from the invention which is to be understood is broadly novel as is commensurate with the appended claim.

The embodiments of the invention in which an exclusive property or privilege is claimed are defined as follows:

1. A coupling comprising:
    a first body member and a second body member,
    said body members each being generally cylindrical in shape,
    said body members each having a first end and a second end,
    a threaded aperture in said first end of each said body member for attaching an end of a shaft thereto,
    a diametrically disposed slot in said second end of said first body member and extending completely through said first body member,
    said slot being generally T-shaped and having flanges extending inwardly and overlying a part of said slot,
    said flanges having a generally flat surface defining a part of said slot,
    said flat surfaces inclining toward the center line of said first body member and toward said first end,
    said second body member having a T-shaped male member on said second end thereof,
    said T-shaped member having a diametrically extending stem portion and a head attached to said stem portion and extending from each side thereof, said T-shaped member being adapted to be freely received in said slot,
said head of said T-shaped member having a surface on each side of said stem portion adjacent said second end,
said surfaces on said head extending toward the center line of said second body member and away from said second body member,
an axial hole in said second body member,
and means on said second body member received in said hole for holding said T-shaped member against lateral sliding in said slot,
said means on said second body member received in said hole in said second body member comprising a pin, and resilient means urging said pin toward said first body member and into said central hole in said first body member,
an inclined surface disposed on said first body member at each end of said slot therein at the center of said slot, said inclined surface inclining toward said second end of said first body member and toward the center thereof, and being adapted to engage said pin for forcing said pin to retract into said head when said head is forced into said slot,
a key hole formed in said first body member perpendicular to said slot and closely adjacent to said slot, said key hole being adapted to receive a key to force said pin to retract into said head, an additional lateral aperture formed in each of said first and second body members and intersecting the respective threaded aperture therein so as to provide an alternate connecting means for the body members.

References Cited

UNITED STATES PATENTS

| | | | |
|---|---|---|---|
| 195,400 | 9/1877 | Richard | 24—129 |
| 348,944 | 9/1886 | Allen | 287—103 |
| 670,328 | 3/1901 | Rigby | 24—129 |
| 1,787,831 | 1/1931 | Morue | 287—103 |
| 2,892,649 | 6/1959 | Kollmann | 287—103 |
| 3,039,340 | 6/1962 | Livermont | 287—103 |
| 3,096,831 | 7/1963 | Adams | 287—103 X |

CARL W. TOMLIN, *Primary Examiner.*

A. KUNDRAT, *Assistant Examiner.*

U.S. DEPARTMENT OF COMMERCE
PATENT OFFICE
Washington, D.C. 20231

UNITED STATES PATENT OFFICE
CERTIFICATE OF CORRECTION

Patent No. 3,402,953            September 24, 1968

Karl J. Kollmann

It is certified that error appears in the above identified patent and that said Letters Patent are hereby corrected as shown below:

In the heading to the printed specification, lines 3 and 4 "Karl J. Kollmann, 3615 Sassafras St., Erie, Pa. 16508" should read -- Karl J. Kollmann, Erie, Pa., assignor, by mesne assignments, to Emerson Electric Co., St. Louis, Mo., a corporation of Missouri --.

Signed and sealed this 17th day of March 1970.

(SEAL)
Attest:

Edward M. Fletcher, Jr.            WILLIAM E. SCHUYLER, JR.
Attesting Officer            Commissioner of Patents